United States Patent [11] 3,588,447

[72] Inventors Edwin R. Mills
Raleigh;
Ernest L. Elmore, Smithfield, N.C.

[21] Appl. No. 803,913
[22] Filed Mar. 3, 1969
[45] Patented June 28, 1971
[73] Assignee Fieldcrest Mills, Inc.
Eden, N.C.

[54] ELECTRICALLY HEATED BEDCOVER AND POWER CONTROL CIRCUIT THEREFOR
11 Claims, 7 Drawing Figs.

[52] U.S. Cl. .......... 219/501, 219/511
[51] Int. Cl. .......... H05b 1/02
[50] Field of Search .......... 219/501, 504, 505, 494; 337/111, 329; 219/511

[56] References Cited
UNITED STATES PATENTS

| | | | |
|---|---|---|---|
| 3,254,838 | 6/1966 | Chambers .......... | 219/494 |
| 3,356,825 | 12/1967 | Mius et al. .......... | 219/494 |
| 3,448,245 | 6/1969 | Brouneus et al. .......... | 219/505 |

*Primary Examiner*—Bernard A. Gilheany
*Assistant Examiner*—F. E. Bell
*Attorney*—Parrott, Bell, Seltzer, Park and Gibson

ABSTRACT: An electrically heated bedcover wherein control over power delivered to an electrical heating element in a blanket is exercised by a semiconductor, gate-controlled, switch in response to low-current level gating signals applied to a gate control element of the semiconductor switch by a gating signal circuit means. The gating signal circuit means includes a positive temperature coefficient switch for increasing the resistance of the signal circuit to a substantially infinite resistance upon exposure to a rising temperature and thereby interrupting the delivery of power through the semiconductor switch to the blanket-heating element.

INVENTORS:
EDWIN R. MILLS and
ERNEST L. ELMORE

BY Parrott, Bell, Seltzer, Park & Gibson
ATTORNEYS

INVENTORS:
EDWIN R. MILLS and
ERNEST L. ELMORE
BY Parrott, Bell, Seltzer, Park & Gibson
ATTORNEYS

ELECTRICALLY HEATED BEDCOVER AND POWER CONTROL CIRCUIT THEREFOR

Electrically heated bedcovers, and particularly electric blankets, resemble conventional bedcovers but include an electrical heating element, such as a resistance wire, disposed therein at the time of manufacture or threaded through channels formed therein at the time of manufacture. Power is delivered to the heating element in such a bedcover, to cause the element to heat and thereby provide warmth for a user.

In electrical blankets as generally known and used, power delivery to the heating element is conventionally under the control of a relatively heavy-duty bimetallic thermostatic switch, wherein a pair of contacts connected in series with the electrical heating element move between open and closed circuit positions in response to varying temperatures affecting a bimetallic armature carrying a movable one of the contacts. Typically, the relatively high-current level required by the heating element for proper heat generation flows through the bimetallic armature.

It is recognized that such bimetallic switching devices have serious deficiencies and that certain difficulties are encountered in use of such controls principally due to the requirement that the device break or open a circuit in which a relatively heavy current or high level of power is flowing. In order to satisfactorily pass the current when closed and to interrupt the voltage and current encountered when open, the contacts and bimetallic armature of the switching device are usually of relatively large, heavy-duty construction and the bimetallic armature is typically constructed for snap-action operation, so that the contacts are quickly drawn apart and arcing hopefully is limited. Nevertheless, operation of such heavy-duty switching devices passing such heavy current typically is accompanied by both arcing and a certain amount of noise resulting from the arcing and from the snap action of the armature. Further, such heavy-duty switching devices are necessarily less accurate than might be desirable due to the relatively large thermal mass of the switching device delaying the switching cycles thereof.

It is an object of the present invention to provide a power control circuit in conjunction with an electrically heated bedcover which makes little or no noise and does not arc during operation, and which also provides accurate control over the delivery of power to an electrical heating element in the bedcover. In realizing this object of the present invention, the previously troublesome heavy-duty bimetallic switching device is replaced with a semiconductor, gate-controlled, switching means operable between conductive and nonconductive states without any movement or relative displacement of contact members. In order to control the delivery of power to the blanket electrical heating element through the semiconductor switching means, a gating signal means is additionally included, for applying to a gate control element of the semiconductor switching means low-current level gating signals which govern the average power delivered through the semiconductor-switching means.

In accordance with the present invention, the gating signal means includes a positive temperature coefficient, thermally responsive means for increasing the resistance of the signal circuit to substantially an infinite resistance upon exposure to a rising temperature and thereby interrupting the delivery of power through the semiconductor-switching means to the blanket-heating element. The aforementioned deficiencies of heavy-duty bimetallic switching devices previously used may be avoided while obtaining the economic and operational benefits of a bimetallic switching device by using a relatively light-duty bimetallic switching device as the positive temperature coefficient means to interrupt low currents or low levels of power. Such a light-duty bimetallic switching device provides several distinct advantages, such as it can incorporate contacts of minimum capacity, it may be of a creep type rather than of the snap-action type, it is relatively inexpensive, and it may be of a relatively small size and will therefore cycle rapidly between open and closed contact positions.

Accordingly, it is a further and more specific object of the present invention to provide a gating signal means operatively connected to a gate control element of a semiconductor-switching device of the type described above wherein a low-current or light-duty bimetallic switching device is employed to control the conduction of low-level gating signals to the gate control element and is responsive to ambient temperature conditions in the area of use of the electrically heated bedcover.

Some of the objects and advantages of the invention having been stated, others will appear as the description proceeds, when taken in connection with the accompanying drawings, in which FIG. 1 is a perspective view of an electric blanket and control means box of this invention;

Figures 1, 2, 3, 4:
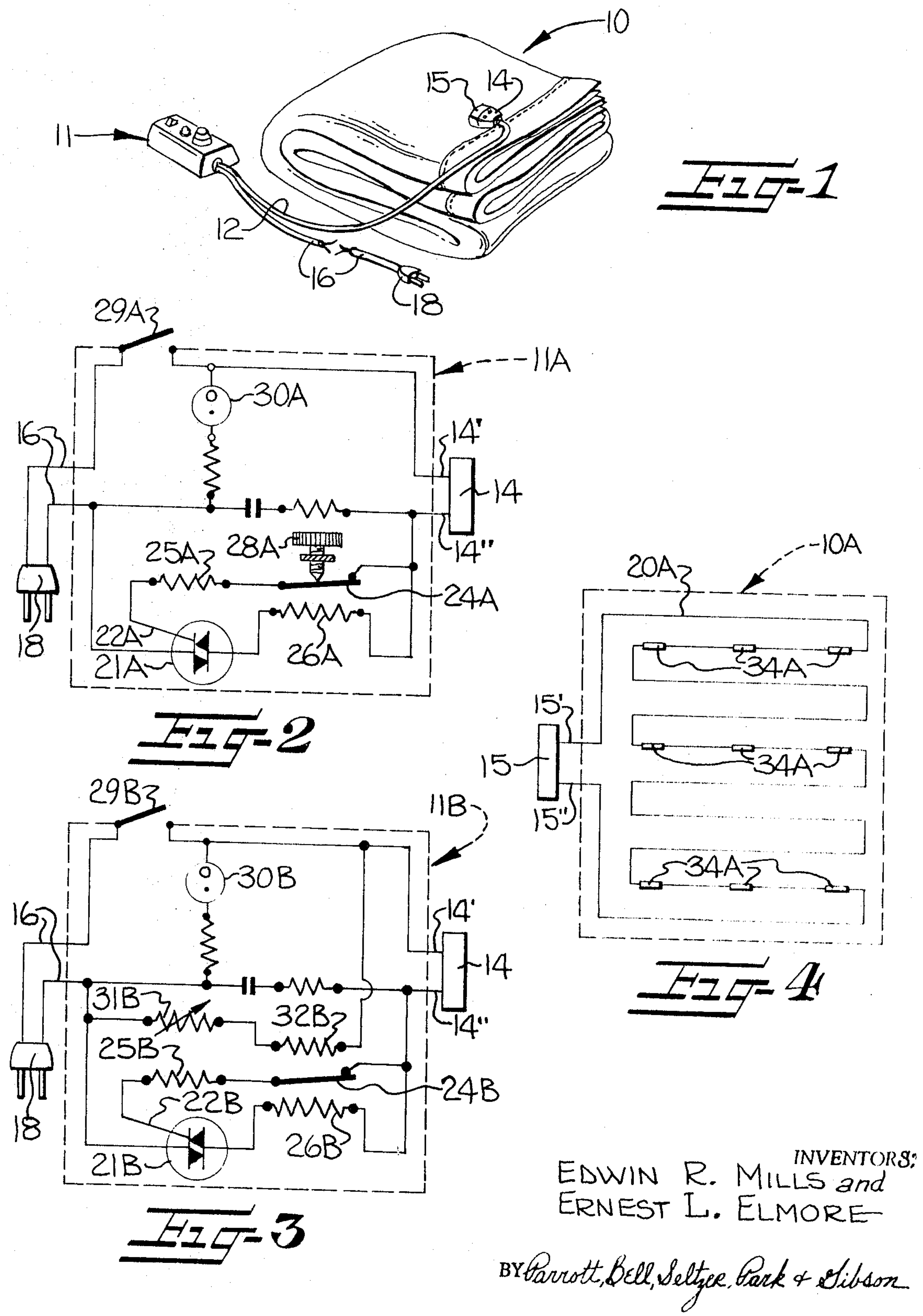
FIG. 2 is a schematic drawing of a first form of control means in accordance with this invention.
FIG. 3 is a schematic drawing of a second form of control means in accordance with this invention.
FIG. 4 is a schematic drawing of a first form of electric blanket wiring in accordance with this invention, for use with the control means of either FIG. 2 or FIG. 3.

Referring now more particularly to the drawings, the electrically heated bedcover of this invention is there shown as including a blanket indicated generally at 10 and a control box indicated generally at 11 (FIG. 1) which are electrically connected during use of the blanket. In use, the blanket is typically spread upon a bed and the control box placed at a location convenient for the user, such as a night stand beside the bed.

Circuits contained in the control box 11 and within the blanket 10 are joined by a suitable multiconductor cable 12, which may comprise two or more conductors or wires depending upon the particular circuitry used. It is conventional to provide mating connectors 14, 15 for the cable 12, in order that the control box 11 and blanket 10 may be separated when not in use, as for storage. A line connector cable 16 is provided for connection of the circuitry within the control box 11 and the blanket 10 with an appropriate source of line voltage, as by means of a wall plug 18.

In accordance with the present invention, the circuitry contained within the control box 11 may take any of several different forms, four of which are respectively shown in FIGS. 2, 3, 5 and 6. For purposes of this discussion, the control means circuitry shown in FIG. 2 will be identified generally by the reference character 11A; that in FIG. 3, by the reference character 11B; that in FIG. 5, by the reference character 11C; and that in FIG. 6, by the reference character 11D. Similarly, the blankets incorporating the circuitry shown respectively in FIGS. 4 and 7 are respectively identified by the reference characters 10A and 10B.

For purposes of an initial discussion of the features and operation of the present invention, reference will be had to a bedcover comprising a control means 11A in accordance with FIG. 2 and a blanket 10A in accordance with FIG. 4. In such an arrangement, warmth for a user of a blanket is derived from the delivery of electrical power to an electrical resistance heating element in the blanket 10A, in the form of a resistance wire 20A extending substantially throughout a heated area of the blanket 10A. The heating element 20A terminates at the connector 15 in a pair of conductors respectively identified as conductors 15' and 15'' for operative connection with a pair of conductors 14' and 14'' in the mating connector plug 14 of the circuitry of the control means 11A.

When so connected, the heating element 20A is included in a main heating circuit which also includes a semiconductor, gate-controlled, switching means 21A operable between a conductive state and a nonconductive state for controlling the average power delivered to the heating element 20A in response to gating signals as discussed more fully hereinafter. The gate-controlled switching means 21A preferably is a thyristor, such as a Triac, gated biswitch, a Quadrac, a symistor or some other similar device.

The Triac is a commercially available thyristor or gate-controlled bidirectional device manufactured and sold by the General Electric Company. While a more detailed description of the characteristics of such a device can be obtained from technical literature available from manufacturers of the devices such as the General Electric Company, it is believed that the following brief description is adequate for the purpose of this disclosure. A thyristor can conduct current in either of two directions, depending upon the polarity of the potential across its load terminals. Accordingly, if the potential of one terminal thereof is positive with respect to the other, the device will conduct current in the required direction. If, on the other hand, the potential of the other terminal is positive with respect to that of the one, the device will conduct current in the reverse direction.

This characteristic of a bidirectional semiconductor-switching means such as a thyristor contributes to a major advantage of the control circuits of the present invention in that conduction of both half-cycles of an alternating line current facilitates adaptation of the power control circuits of the present invention to electrical heating resistance wire as has heretofore been used in conventional electrical blankets. Thus, manufacturers of electrical blankets in accordance with the present invention need not revise the design standards heretofore applied in the production of heating wire. Further, conduction of both half-cycles facilitates obtaining a greater wattage output of heat from the resistance wire than would be the case were a rectified current or only a portion of only one half-cycle of the alternating line current conducted to the heating element.

The bidirectional conducting device 21A is triggered into a conducting state by a low-current level gating signal applied to a control gate element 22A. Once triggered into conduction, the device remains conducting until the current flowing through the device is reduced below a known minimum holding current value, in an operation characterized as latching. Where alternating current is involved, a thyristor is turned off automatically upon passage of the current through the zero value region, as the current through the switching device drops below the minimum holding value and the device automatically turns off.

In order to apply to the gate control element 22A of the semiconductor-switching means 21A, gating signals which govern the triggering of the switching means between conductive and nonconductive states, the gate control element 22A is operatively connected to a gating signal means. In accordance with the present invention, the gating signal means includes a positive temperature coefficient means which is responsive to temperature conditions by varying the resistance of the gating signal circuit in such a manner as to vary the current level of the gating signals and thus control the average power delivered to the heating element 20A through the semiconductor-switching means 21A.

In the forms illustrated, the positive temperature coefficient means is a switching device operable at conductive and nonconductive states in response to temperature variations, and is specifically shown as a bimetallic switch 24A. The bimetallic switch 24A is arranged in such a manner that the contacts thereof are moved with a rise in temperature from a closed or conductive state in which the switch presents a nominal, low resistance to an open or nonconductive state in which the switch presents a substantially infinite resistance, and thus the bimetallic switch operates as a positive temperature coefficient means in the sense that that term is used herein. Upon the resistance of the gating means circuit becoming infinite as the contacts of the switch device move to the open or nonconductive state, the voltage level of gating signals applied to the gate control element 22A is reduced to zero, and the semiconductor-switching device 21A becomes nonconductive. In order to limit the voltage and current level of the gating signals, insuring proper biasing of the gate control element 22A while the switch 24A is closed and the semiconductor-switching means 21A is in the conductive state, it is preferred to include a biasing resistor 25A in the gating signal circuit.

The positioning of the positive temperature coefficient switch 24A within the control means 11A, and remote from the blanket 10A, permits ready adaptation of the switch 24A to compensation for ambient temperature conditions and for adjustment of the heating of the blanket 10A in accommodation of personal preferences of users thereof as to warmth. In particular, previous experience with electrically heated bedcovers has been that users of such bedcovers prefer that a substantially uniform and even temperature be maintained during use of the bedcover. As may be anticipated, the temperature which various users may wish to obtain will vary, but the circumstances of use of such bedcovers frequently require that the selected degree of warmth be maintained while ambient temperature in the area of use of the bedcover may range over as much as 25° F. Thus, it is anticipated that commercial acceptance of the bedcover of the present invention will be most readily achieved where provisions are incorporated both for individual adjustment of the warmth obtained in use of the bedcover and of compensation for ambient temperature conditions.

These ends are achieved by the inclusion of an ambient temperature compensation electrical heating element 26A and a means for biasing the bimetallic temperature-sensitive switch 24A. In the embodiment illustrated in FIG. 2, the means for biasing the switch 24A is an adjustable abutment means 28A for engaging the bimetallic armature and mechanically biasing the same.

In operation, a user of the blanket 10A may adjust the position of the adjustable abutment means 28A to mechanically bias the bimetallic armature of the switch 24A for operation thereof at a settable temperature. Line voltage may then be applied to the heating circuit and gating circuit of the bedcover by closing a line switch 29A, which additionally energizes a neon pilot lamp 30A to advise the user that current has been applied to the circuitry of the electrically heated bedcover. With the positive temperature coefficient bimetallic switch 24A in the conductive state, a gating signal is applied to the gate control element 22A of the semiconductor-switching means 21A, resulting in the same being switched to the conductive state during both half-cycles of the alternating line current and thus in the delivery of a power to the electrical heating element 20A and the blanket 10.

At the same time, current flowing through the electrical heating element 20A flows through the ambient compensation heating element 26A, which is placed adjacent to and therefore is thermally coupled to the bimetallic switch 24A. As the switch 24A is heated to its operating temperature, the contacts thereof are opened, the resistance in the gating circuit is raised, and the current level of the gating signals is thereby reduced to switch the semiconductor-switching means 21A to the nonconductive state. With the removal of power from the heating elements 20A and 26A, the bimetallic switch 24A cools toward the temperature at which the contacts thereof become closed and the delivery of power is resumed.

Due to the positioning of the bimetallic switch 24A and the ambient compensation heating element 26A in the control means 11A, the heating and cooling of the bimetallic switch is dependent in part upon the ambient temperature conditions in the room where the electrically heated bedcover is in use and in part upon the power delivered to the blanket heating element 20A. The semiconductor-switching means 21A is switched between the conductive and nonconductive states in a manner which controls the average power delivered to the heating elements 20A and 26A to maintain a substantially constant temperature beneath the electrically heated bedcover.

During such operation, the limitation of level of gating signals by the resistor 25A in series with the bimetallic switch 24A permits the bimetallic armature thereof to be constructed for creep operation rather than for snap-action. That is, the motion of the armature in separating the contacts of the bimetallic switching device occurs smoothly at the temperature of operation, with the low level of the gating signals providing a control over arcing. Further, the armature is of relatively low thermal mass to facilitate prompt response to fluctuations in the temperature to which the armature is to be exposed.

The operation of thyristors and similar semiconductor switch means under certain conditions may give rise to voltage transients which cause emission of radiant energy at radio frequencies. When emitted from a thyristor control, such radio frequency energy will interfere with and seriously impede the reception of conventional broadcasts by home entertainment radios and other radio receivers. Recognizing the possibility that such interference may result from use of the power control circuits of the present invention, it is preferred that the circuits include such resistance-capacitance and/or inductance components as are required to prevent interference with radio receiver devices in the area of use of the electrically heated bedcover. While not specifically identified by reference characters, resistors and capacitors are shown in the control circuits of FIGS. 2, 3, 5 and 6 for accomplishing this purpose.

The second form of control circuitry, shown in FIG. 3 as control means 11B, is generally similar in arrangement and function to that described above with reference to the circuitry of control means 11A, and similar elements have been identified by similar reference characters using the suffix letter B instead of the suffix letter A. In distinction from the first form of control means circuitry, the positive temperature coefficient bimetallic switch 24B is thermally biased rather than being mechanically biased. More particularly, adjustment of a set point temperature by a user of the control means 11B is accomplished by varying the resistance of a variable resistor 31B, and thereby varying the current flow through a set point biasing heating element 32B. The set point heating element 32B is positioned adjacent and thereby thermally coupled to the bimetallic switch 24B, in similarity to the ambient compensating heating element 26B. Thus, the bimetallic switch 24B is exposed to heat not only during periods that the semiconductor switching means 21B is in a conductive state but at all times that the line switch 29B is closed. By varying the thermal bias thus imposed, a user of a control means 11B may govern the rate of heat generation by the electrically heated bedcover while maintaining the advantages of ambient temperature compensation.

It has long been recognized that an electric blanket may develop an overheating condition, either locally or generally throughout the blanket, which is detrimental to the material of the blanket and dangerous to a user should the blanket be bunched, folded, or covered with a material having good thermal insulation qualities. These dangerous and detrimental effects of such overheating conditions may be avoided by overheat protective means and it is contemplated that the power control circuitry of the present invention include such overheat-protective means.

One such overheat-protective means is illustrated in the first and second forms of control means and in the first form of a blanket used therewith (FIGS. 2, 3 and 4). Specifically, the main heating circuit includes a plurality of overheat-protective devices 34A dispersed substantially throughout the heated area of the blanket 10A and electrically connected in series with the electrical heating element 20A. The overheat-protective devices 34A are at least loosely thermally coupled to the heating element 20A, and are each responsive to the occurrence of a localized overheated condition for interrupting the flow of current in the main heating circuit. Preferably, the devices 34A are normally closed bimetallic thermostatic switches.

Figure 5:
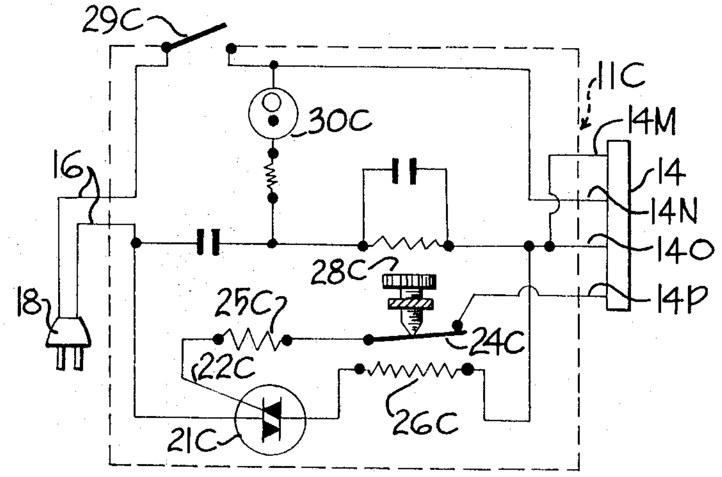
FIG. 5 is a schematic drawing of a third form of control means in accordance with this invention, similar to the control means of FIG. 2.
Figures 6, 7:
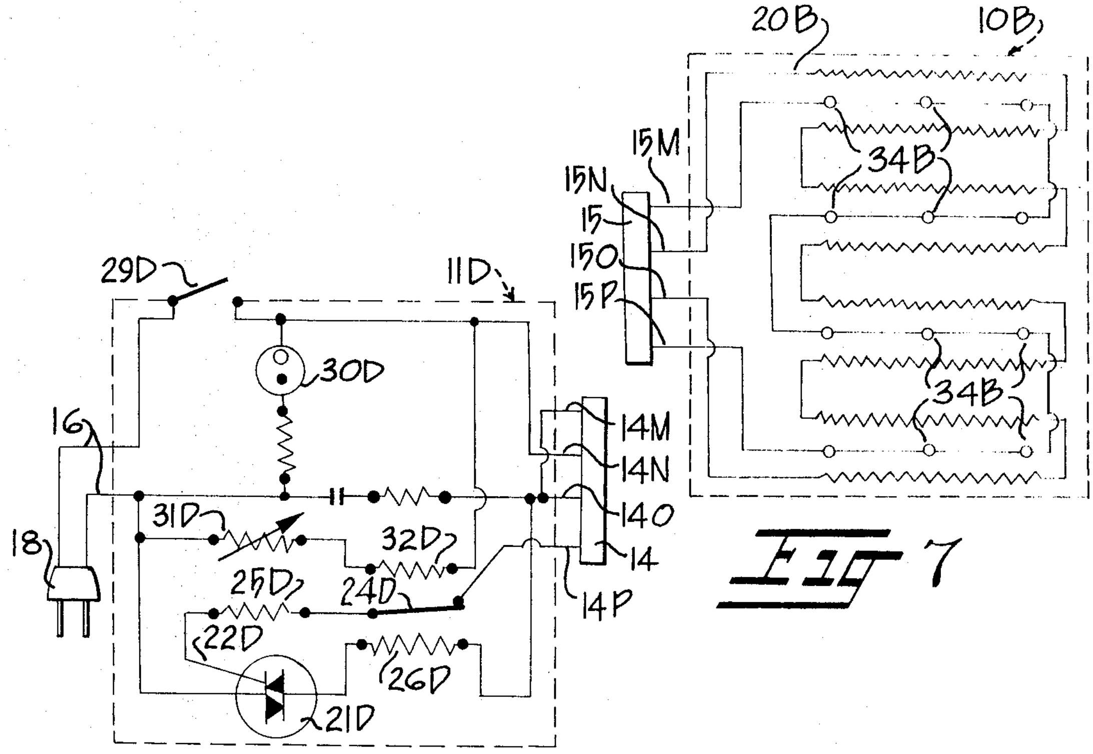
FIG. 6 is a schematic drawing of a fourth form of control means in accordance with this invention, similar to the control means of FIG. 3.
FIG. 7 is a schematic drawing of a second form of electric blanket wiring in accordance with this invention, for use with the control means of either FIG. 5 or FIG. 6.

Turning now to third and fourth forms of control means circuitry, shown as enclosed within control means 11C (FIG. 5) and control means 11D (FIG. 6), and to a second form of blanket circuitry for use therewith (as shown in FIG. 7), a blanket overheat-protective arrangement is there provided which is distinct from that discussed immediately above in that the occurrence of a localized overheated condition in the blanket 10B results at least initially in modulation of the average power delivered to the heating element 20B thereof to a lower level, rather than in interruption of the delivery of power thereto. More particularly, the circuitry of the control means 11C is generally similar to that of the first form of control means 11A, as including an adjustable means 28C for mechanically biasing the bimetallic armature of a bimetallic switch 24C.

In distinction, however, the circuitry of the control means 11 is joined to the circuitry of the associated blanket 10B by a four-conductor cable, including conductors terminating at the connectors 14 and 15 and identified by the addition to those reference characters of the suffix characters M, N, O and P. The conductors M and N form a portion of the main heating circuit which includes the semiconductor-switching means 21C, the electrical heating element 20B in the blanket 10B, and the ambient compensating heating element 26C. Two additional conductors, namely conductors O and P, are in the gating signal circuit including the positive temperature coefficient bimetallic switching device 24C, and electrically connect in series therewith a plurality of overheat-protective devices 34B dispersed throughout the heated area of the blanket 10B. The overheat-protective devices 34B preferably are positive temperature coefficient resistance devices, wherein the resistance of the device varies directly with the temperature to which the device is subjected, and are at least loosely thermally coupled to the blanket-heating element 20B. Thus, upon the occurrence of a localized overheated condition of the blanket 10B, the resistance of the gating signal circuit is increased by an incremental amount, thus modulating the current level of gating signals applied thereby downwardly and modulating downwardly the average power delivered to the heating element 20B of the blanket 10B. The resistance values and range of variation of the overheat-protective devices 34B may be so chosen that a severe overheating condition results in complete interruption of delivery of power to the blanket heating element 20B.

A blanket incorporating positive temperature coefficient resistance devices as the overheat-protective devices 34B may additionally be used in conjunction with a control means 11D (FIG. 6) wherein the bimetallic switching device 24D is thermally biased by a biasing heating element 32D with the amount of biasing controlled by a variable resistor 31D, in similarity to the arrangement discussed above with regard to FIG. 3.

Overheat protection provided in this manner is distinguished from that provided by the current-interrupting thermostats 34A discussed above in that the average power delivered is reduced only to that level where appropriate balance is achieved. In instances where the overheated condition has resulted from placing over the bedcover a material having good thermal insulating qualities, such as a bedspread or the like, the inclusion of the overheat-protective means in the gating signal circuit as contemplated by the circuitry illustrated in FIGS. 5, 6 and 7 provides adequate protection for a user of the blanket without excessive interference with use of the electrically heated bedcover.

In accordance with a particular feature of the present invention, the overheating protective means provided for the blankets 10A and 10B of the present invention is fail-safe. That is, failure of one of the temperature-sensitive elements 34A or 34B results in no current being delivered to the associated blanket-heating element 20A and 20B through the semiconductor-switching means of the control means electrically connected thereto. Thus, a user of the electrically heated bedcover is protected against possible injury otherwise occurring from an overheated condition even in the event of failure of the circuit elements normally operative to protect against such conditions. In the instance of the blanket of FIG. 4, such protection is due to failure of the devices 34A in an open circuit condition, which precludes continued current flow even though not affecting the application of gating signals to the semiconductor-switching means. In the instance of the blanket of FIG. 7, failure of the positive coefficient resistance devices 34B interrupts delivery of gating signals to the associated semiconductor-switching means, thereby precluding the triggering of that means into a conductive state. Protection provided in this manner is understandably of particular importance for the safety of users of the electrically heated bedcover of the present invention.

In the drawings and specification, there have been set forth preferred embodiments of the invention, and although specific terms are employed, they are used in a generic and descriptive sense only and not for purposes of limitation.

We claim:

1. In an electrically heated bedcover including a blanket and an electrical heating element in said blanket for generating heat upon the flow of electrical current therethrough, the improvement which comprises:

semiconductor-switching means electrically connected in series with said heating element for controlling electrical current flowing therethrough and including a gate control element;

an ambient temperature-compensating electrical heating element connected in series with said semiconductor-switching means for generating heat upon flow of current therethrough and to said blanket-heating element; and gating signal means connected to said gate control element of said semiconductor-switching means for applying low-level gating signals thereto to trigger said semiconductor-switching means from a nonconductive state into a conductive state and thereby for controlling the average power delivered to said heating elements, said gating signal means including thermally responsive means thermally coupled to said ambient temperature-compensating heating element and responsive to changes in temperature above and below a predetermined temperature correlated to the comfort of a user of the bedcover for increasing the resistance of said gating signal means upon a rise in the temperature to which said thermally responsive means is exposed for thereby modulating the gating signals.

2. An electrically heated bedcover according to claim 1 wherein said positive temperature coefficient means comprises a temperature-sensitive switch operable at a nominal low resistance and a substantially infinite resistance for interrupting the gating signals on a rise in temperature to which said switch is exposed.

3. An electrically heated bedcover according to claim 2 wherein said semiconductor-switching means is a bidirectional conducting device for controlled conduction of both half-cycles of alternating current through said blanket-heating element.

4. An electrically heated bedcover according to claim 3 further comprising a plurality of overheat-protective devices disposed substantially throughout said blanket, responsive to the existence of an overheated condition in said blanket, and electrically connected for decreasing current flow through said blanket-heating element upon an overheated condition coming into existence in said blanket.

5. An electrically heated bedcover according to claim 2 further comprising a plurality of overheat-protective devices disposed throughout said blanket and electrically connected in series with said temperature-sensitive switch, said protective devices being responsive to the existence of an overheated condition in said blanket for decreasing the level of current present at said gate control element and thereby decreasing the current flow through said blanket-heating element.

6. An electrically heated bedcover according to claim 2 wherein said temperature-sensitive switch includes a bimetallic armature movable on a rise in temperature from a circuit-closed position at which said switch presents said nominal low resistance to a circuit open position at which said switch presents said substantially infinite resistance.

7. An electrically heated bedcover according to claim 6 further comprising an adjustable abutment means for engaging said bimetallic armature and mechanically biasing the same for operation of said temperature-sensitive switch at a settable temperature so that a user of the bedcover may adjust the heating thereof to accommodate personal preferences as to warmth.

8. An electrically heated bedcover according to claim 6 further comprising a set point heating means thermally coupled to said bimetallic armature for thermally biasing the same and an adjustable regulating means operatively connected to said set point heating means for determining the rate of heat generation thereby and thus controlling the thermal biasing of said bimetallic armature for operation of said temperature-sensitive switch at a settable temperature so that a user of the bedcover may adjust the heating thereof to accommodate personal preferences as to warmth.

9. In an electrically heated bedcover including a blanket and an electrical heating element in said blanket for generating heat upon the flow of electrical current therethrough, the improvement which comprises:

semiconductor-switching means connected to said heating element for controlling electrical current flowing therethrough and including a gate control element; and gating signal means connected to said gate control element of said semiconductor-switching means for applying low-level gating signals thereto to trigger said semiconductor-switching means from a nonconductive state into a conductive state and thereby for controlling the average power delivered to said heating element, said gating signal means including a bimetallic switching device operable at a nominal low resistance and a substantially infinite resistance and responsive to changes in temperature above and below a predetermined temperature correlated to the comfort of a user of the bedcover for directly interrupting the gating signals in accordance with the temperature to which said bimetallic switching device is exposed.

10. An electrically heated bedcover according to claim 9 wherein said gating signal means further includes an electrical resistor for limiting the current level of gating signals flowing through said bimetallic switching device.

11. An electrically heated bedcover according to claim 10 wherein said bimetallic switching device includes a movable armature of the creep type.